United States Patent
Goodwin (10) Patent No.: US 10,681,877 B1
(45) Date of Patent: Jun. 16, 2020

(54) PLANT GROWING SYSTEM

(71) Applicant: Robert Goodwin, Smithfield, RI (US)

(72) Inventor: Robert Goodwin, Smithfield, RI (US)

( * ) Notice: Subject to any disclaimer, the term of this patent is extended or adjusted under 35 U.S.C. 154(b) by 269 days.

(21) Appl. No.: 15/667,617

(22) Filed: Aug. 2, 2017

(51) Int. Cl.
| | |
|---|---|
| *A01G 9/02* | (2018.01) |
| *A01G 9/12* | (2006.01) |
| *A01G 9/24* | (2006.01) |
| *A01G 31/02* | (2006.01) |
| *A01G 27/00* | (2006.01) |
| *A01G 9/26* | (2006.01) |
| *A01G 31/00* | (2018.01) |

(52) U.S. Cl.
CPC .............. *A01G 31/02* (2013.01); *A01G 9/247* (2013.01); *A01G 9/26* (2013.01); *A01G 27/003* (2013.01); *A01G 2031/006* (2013.01)

(58) Field of Classification Search
CPC .......... A01G 31/02; A01G 31/06; A01G 9/02; A01G 9/022; A01G 27/003; A01G 27/005; A01G 27/00; A01G 27/001; A01G 9/247; A01G 9/26
See application file for complete search history.

(56) References Cited

U.S. PATENT DOCUMENTS

| | | | | |
|---|---|---|---|---|
| 4,662,106 A | * | 5/1987 | Mori ....................... | A01G 7/045 47/17 |
| 5,675,932 A | * | 10/1997 | Mauney ................. | A01G 31/02 47/17 |
| 2014/0305041 A1 | * | 10/2014 | Moss ....................... | A01G 9/02 47/66.7 |
| 2015/0334928 A1 | * | 11/2015 | Kort ........................ | A01G 9/126 47/62 R |
| 2016/0044879 A1 | * | 2/2016 | Hamlin ................. | A01G 27/003 47/62 R |
| 2016/0185676 A1 | * | 6/2016 | Nishiyama ............. | A01G 22/00 47/58.1 SC |
| 2016/0192606 A1 | * | 7/2016 | Karbowski ............. | A01G 31/02 47/62 A |
| 2016/0249536 A1 | * | 9/2016 | Mermelstein ............ | A01G 9/12 47/65.5 |
| 2017/0339854 A1 | * | 11/2017 | van der Merwe ... | A01G 9/1438 |
| 2018/0014485 A1 | * | 1/2018 | Whitcher .................. | A01G 2/20 |
| 2018/0220606 A1 | * | 8/2018 | Daniel ...................... | A01G 9/12 |
| 2018/0368346 A1 | * | 12/2018 | Watson .................. | A01G 31/06 |

* cited by examiner

*Primary Examiner* — Son T Nguyen
(74) *Attorney, Agent, or Firm* — Gulf Coast Intectual Property Group (57) ABSTRACT

A plant growing system configured to facilitate the growing of plants in an indoor environment. The plant growing system includes a reservoir fluidly coupled to a plurality of plant buckets by a pipe network. The pipe network has additionally operably coupled thereto a water temperature controller, an ozonator and a controller wherein the controller is configured to transfer water from the reservoir into the plurality of plant buckets. Each of the plant buckets has a float valve operably coupled to the pipe network which function to maintain the water level inside of the plant buckets. A plant support member is configured to be superposed the plant buckets and is operable to have a plant disposed therein. A metering pump and nutrient container are further provided so as to introduced contents disposed within the nutrient container into the reservoir. The pipe network includes a plurality of air vent lines.

6 Claims, 6 Drawing Sheets

PLANT GROWING SYSTEM

FIELD OF THE INVENTION

The present invention relates generally to a growing system for plants, more specifically but not by way of limitation, a plant growing system that includes hardware such as but not limited to a water reservoir, tubing network, pumps and water chillers. Further the plant growing system of the present invention includes plant buckets and a method for feeding the plants during various stages of growth.

BACKGROUND

Growing plants indoors has seen a significant increase in popularity over the last decade. Utilizing an indoor atmosphere allows a grower to control the climate and ultimately leads to better plant production and harvest if the plants grown produce a harvestable product. Many different types of plants require a significant amount of light and as such when growing plants indoors, growers will attempt to provide as much light as possible through utilization of strong lights such as but not limited to metal halide lights. The more light a grower can provide will often result in a larger yield if the plant is a plant type that will produce a harvestable crop. While providing the correct amount of light is important, the remainder of indoor plant growing techniques are just as important so as to produce a healthy plant and or harvest.

One issue with indoor plant growing is the maintenance of a feeding the plant during a plants various growth stages. Most plants go through various growth stages wherein the requirements of water and nutrients often vary during these growth stages. As plants transition through the growth stages it is difficult for a user to be able to maintain the proper amount of water and nutrients in an automated manner. No indoor plant growth management exists that provides water as need to plants and further any water provided does not include nutrients nor has it been ozonated so as to introduce a more pure water to the plant. Adding ozone to the water used for feeding plants provides a technique to safely disinfect the water so as to allow a user to control the type of bacteria introduced into the water that may provide a growth benefit to the plant.

Accordingly, there is a need for a plant growing system that includes a plurality of hardware components and a method that is operable to provide optimum growth of a plant indoors wherein much of the operation of the plant growing system is automated.

SUMMARY OF THE INVENTION

It is the object of the present invention to provide a plant growing system configured to assist a grower with growing plants indoors wherein the plant growing system includes a water reservoir.

Another object of the present invention is to provide a plant growing system configured to assist in the growing of plants indoors that further includes a plumbing network having a main line wherein the main line includes an air vent pipe.

A further object of the present invention is to provide a plant growing system operable to provide automated assistance of some feeding tasks wherein the plant growing system includes a plumbing network that includes an inline water temperature control module.

Still another object of the present invention is to provide a plant growing system that provides the ability to grow plants indoors wherein the plumbing network further includes a liquid feed introduction chamber and a pump to introduce liquid feed into the water reservoir of the plant growing system.

An additional object of the present invention is to provide a plant growing system that is configured to provide the growing of plant in an indoor environment wherein the plumbing network further includes an ozonator that is configured to treat water passing therethrough.

Yet a further object of the present invention is to provide a plant growing system operable to assist in the growing of plants indoors wherein the plumbing network includes a plurality of plant buckets.

An alternate object of the present invention is to provide a plant growing system that is operable to enhance a plant's growth in an indoor environment wherein the plant buckets further include a float shield disposed therein.

Another object of the present invention is to provide a plant growing system that is operable to provide assistance for growing plants in an indoor environment wherein the plant buckets further have a plant support member operably coupled thereto.

Yet a further object of the present invention is to provide a plant growing system for growing plants indoors wherein the plant growing system includes a method for controlling feed and water dispensing during various different growth stages of the plants.

An additional object of the present invention is to provide a plant growing system for growing plants indoors wherein the plumbing network includes a controller operable to distribute water to the plumbing network.

Another object of the present invention is to provide a plant growing system that is configured to provide the growing of plant in an indoor environment wherein the plumbing network includes a plurality of air vents.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is illustrated a plant growing system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to FIG. 1 through FIG. 4, a discussion of the plant bucket 10 and plant support member 40 follows. The plant growing system 100 includes a plurality of plant buckets 10 and plant support members 40. While in the preferred embodiment of the plant growing system 100 a plurality of plant buckets 10 and plant support members 40 are preferred, it is contemplated within the scope of the present invention that the plant growing system 100 could have only one plant bucket 10 and plant support member 40. The plant bucket 10 includes body 12 having a plurality of walls 13 and bottom 14 integrally formed to create an interior volume 15. The plant bucket is manufactured from a suitable rigid material capable that is capable of retaining water such as but not limited to plastic. It is contemplated within the scope of the present invention that the plant bucket 10 could be provided in alternate sizes and shapes to accommodate various species of plants. Secured to the opening of the body 12 of the plant bucket 10 is top member 20. Top member 20 includes top support 21 that is planar in manner having an aperture 22 wherein the aperture 22 has encircled therearound support member 23. Support member 23 functions to engage support disk 49 of the plant support member 40 as is further discussed herein. Top member 20 has formed therein a corner aperture 25 that functions to provide access to the float 30 and interior volume 15 once a plant and plant support member 40 are mounted to the plant bucket 10.

Figure 3:
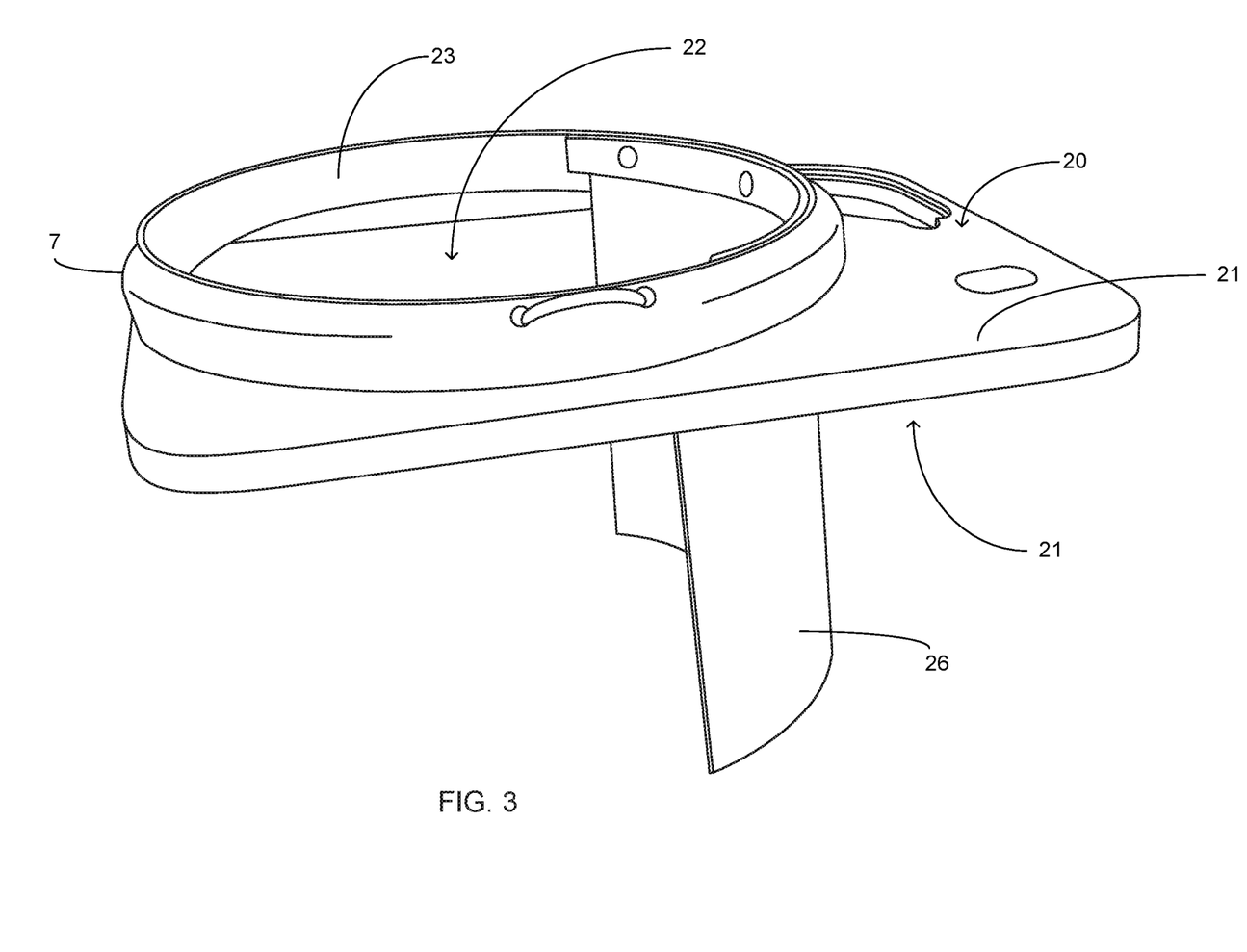
FIG. 3 is a side view of the top portion and float shield of the plant bucket.

Secured to the bottom side 19 of the top support 20 is deflector panel 26. Deflector panel 26 is manufactured from a rigid material such as but not limited to plastic. The deflector panel 26 is arcuate in shape and functions to provide structural protection for the float 30. Float 30 is hingedly attached to top support 21 and is operable to provide automated control of water entry into the interior volume of the plant bucket 10. Float 30 functions similarly to a conventional float valve in a toilet tank wherein ensuing achievement of a desired volume the float has been moved in an upward direction by the water level in the interior volume 15 so as to close a valve and shut off the entry of water into the interior volume 15 of the plant bucket 10. The deflector panel 26 is formed in an arcuate shape as this shape minimizes the intrusion of the deflector panel 26 into the interior volume 15. The deflector panel 26 extends downward from the top support 20 at a length that is at least equivalent to the position of the plant net member 50 ensuing its disposal into the interior volume 15 of the plant bucket 10. The deflector panel 26 inhibits roots of a plant from affecting the float 30. While not illustrated herein, it is contemplated within the scope of the present invention that the plant buckets 10 are provided with a removable liner so as to facilitate the improved maintenance thereof wherein intermediate plant growths the liner can be changed so as to eliminate the need to clean the plant bucket with chemicals that may adversely affect any plant disposed within the plant bucket 10.

Figure 1:
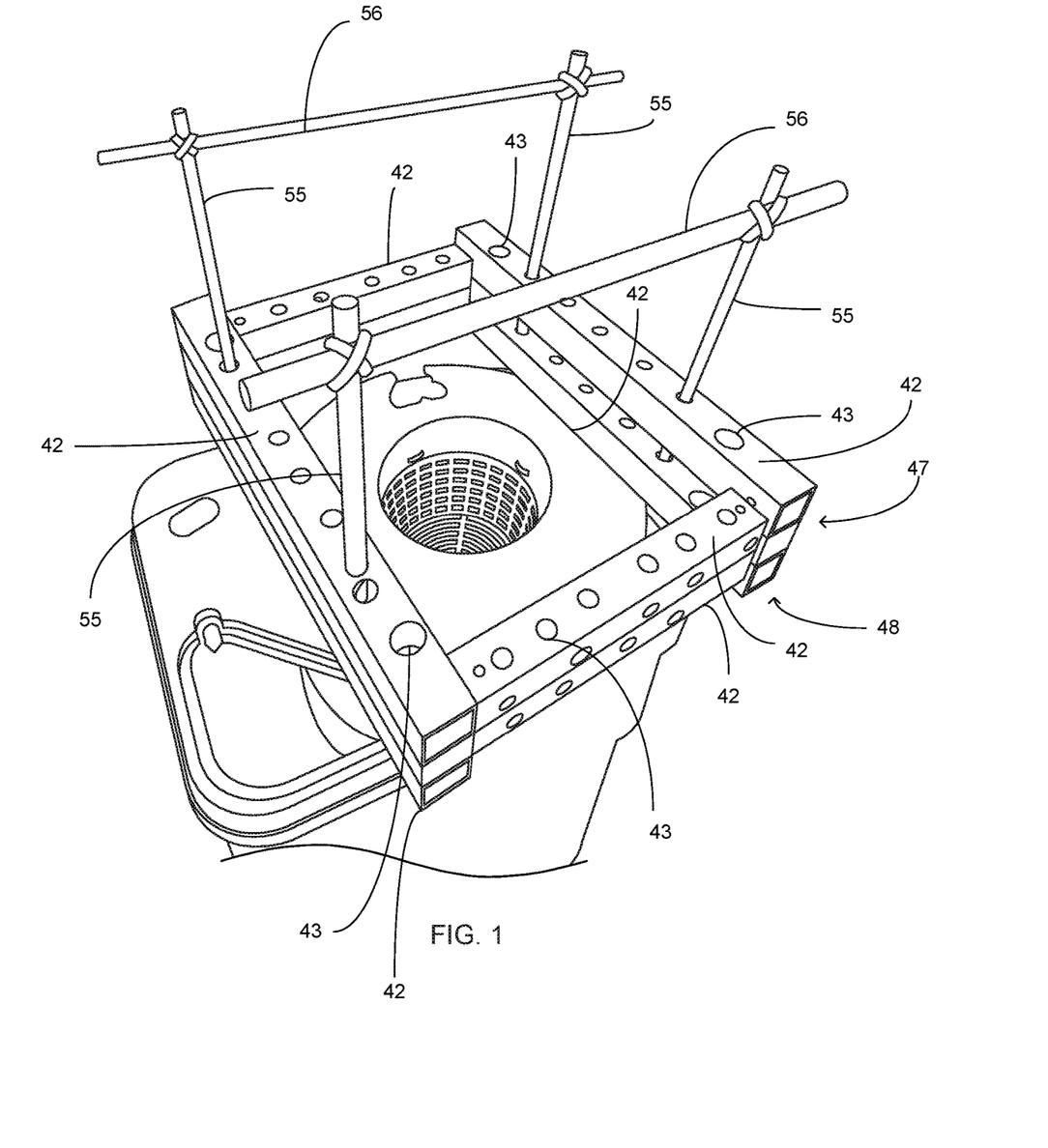
FIG. 1 is a top view of the plant support member superposed a plant bucket.
Figure 2:
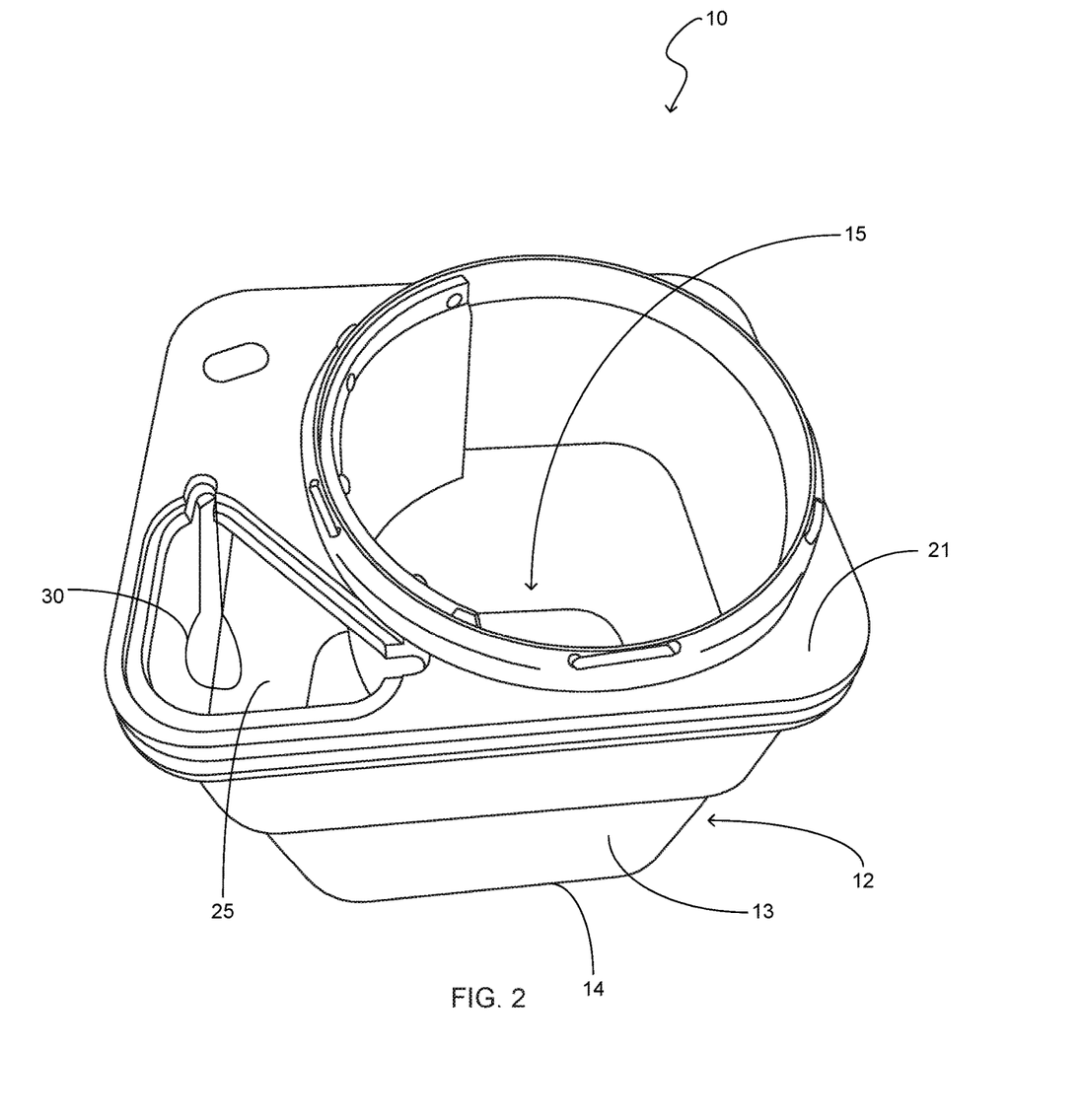
FIG. 2 is a top view of a plant bucket.
Figure 4:
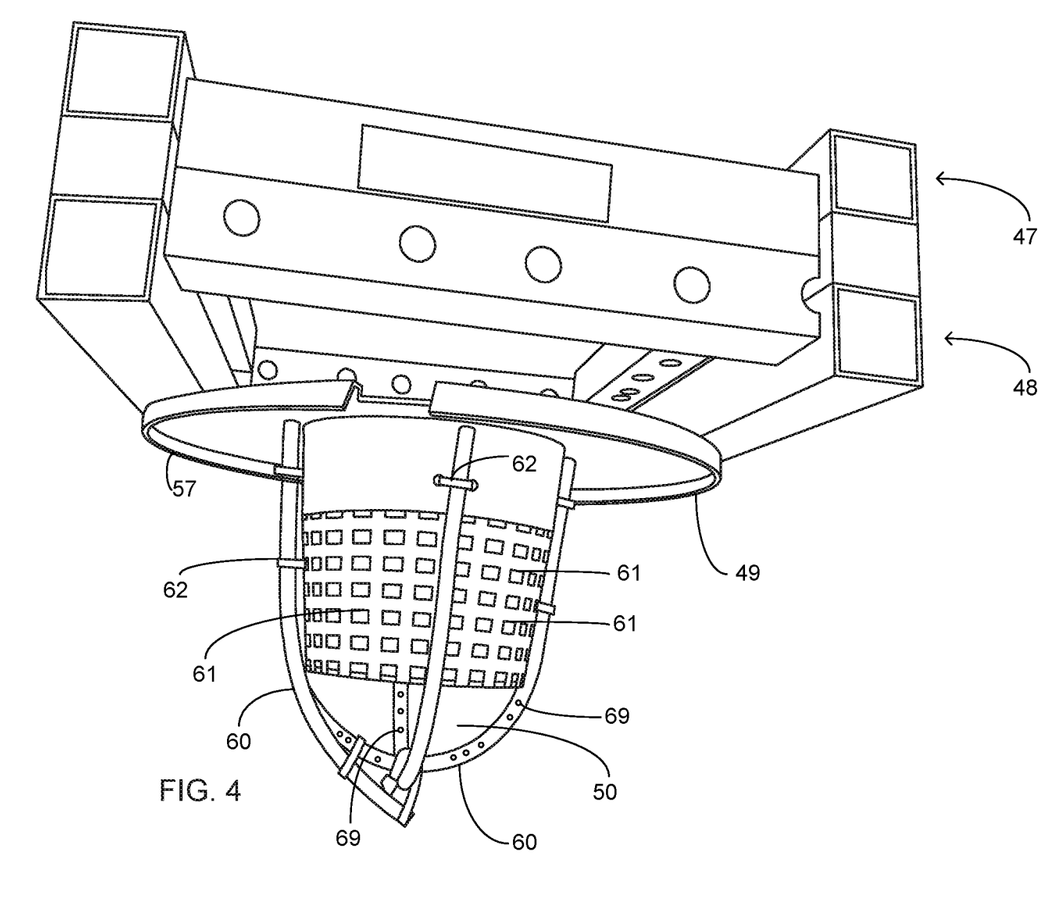
FIG. 4 is a side view of the bottom portion of the plant support member of the present invention.

The plant support member 40 is configured to be superposed the plant bucket 10. The plant support member 40 includes a first layer 47 of four support members 42 and a second layer 48 of four support members 42 vertically arranged and integrally formed into a square shape. The support members 42 are manufactured from a lightweight rigid material such as but not limited to plastic. The support members 42 include a plurality of holes 43. The first layer 47 and second layer 48 of the support members 42 provide sufficient structural support for the plant support poles 55. The support poles 55 are sized so as to be journaled into holes 43 wherein the holes 43, the first layer 47 and second layer 48 function to vertically orient and support the support poles 55. The support poles 55 have secured thereto horizontal support members 56. The horizontal support members 56 in combination with the plant support poles 55 provide structural support for a plant during a plant's growth cycle. It is contemplated within the scope of the present invention that the plant support member 40 could have numerous arrangements and quantities of the support poles 55 and horizontal support members 56 as required to provide effective support for a plant.

The plant support member 40 includes support disk 49 secured to second layer 48 utilizing suitable durable techniques. Support disk 49 is annular in shape and functions to mateably engage support member 23 so as to provide a secure coupling of the plant support member 40 with the plant bucket 10. The support disk 49 includes lip member 57 that extends downward therefrom so as to engage the sidewall 7 of support member 23 so as to inhibit lateral movement of the plant support member 40 ensuing being superposed the plant bucket 10. While a support disk 49 and a support member 23 have been disclosed herein, it is contemplated within the scope of the present invention that the plant support member 40 and plant bucket 10 could utilize alternate configuration to ensure stability ensuing the coupling thereof.

Extending downward from the support disk 49 is plant net member 50. Plant net member 50 is secured to support disk 49 utilizing suitable durable techniques and is manufactured from a flexible material such as but not limited to plastic. The plant net member 50 is configured to provide containment and support of a plant root system. The plant growing system 100 is a hydroponic system wherein no soil is disposed within the plant bucket 10 only water. As such the plant net member 50 provides the necessary support for root structures of plants during their growth cycle. Further the apertures 61 of the plant net member 50 allow for penetration of the water and nutrients into the root structure of a plant. The plant net member 50 includes support hoses 60 that are disposed along the exterior of the plant net member 50. The support hoses 60 are manufactured from a flexible material and are secured to the plant net member 50 utilizing ties 62. The support hoses 60 function to provide additional structural support for the plant net member 50 as a plant root system enlarges. The support hoses 60 are further operably coupled to an air source so as to facilitate the introduction of air proximate a root ball of a plant. Air introduced into support hoses 60 propagates through apertures 69. It is further contemplated within the scope of the present invention that an air stone could be operably coupled to the support hoses 60 so as to provide diffusion of air exiting therefrom. While not particularly illustrated herein, it is contemplated within the scope of the present invention that the plant growing system 100 includes an emergency shut-off valve for water so as to inhibit flooding of a structure in which the plant growing system 100 is disposed. It should be understood by those skilled in the art that numerous configurations of an emergency shut-off valve could be deployed to achieve the desired stated objective.

Figure 5:
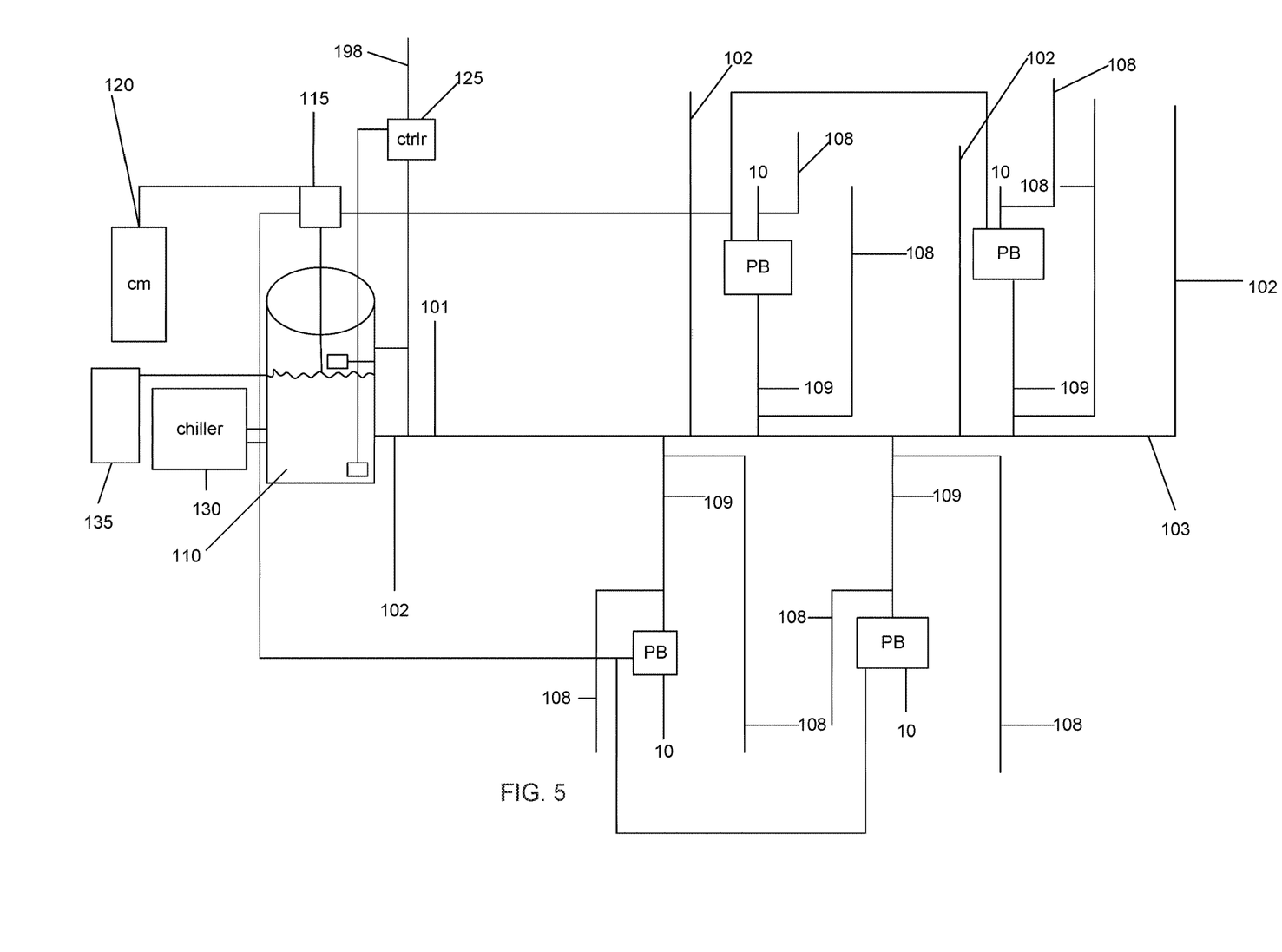
FIG. 5 is a schematic diagram of the plant growing system of the present invention.

Referring now to FIG. 5, a schematic diagram of the plant growing system 100 is illustrated therein. The plant growing system 100 includes a reservoir 110. The reservoir 110 is utilized to store and distribute fortified water to the remainder of the plant growing system 100. The reservoir 110 is manufactured from a material that is sufficient to receive and retain water and it is contemplated within the scope of the present invention that the reservoir 110 is at least fifty-five gallons in size. Those skilled in the art should recognize that the reservoir 110 could be constructed in various different sizes. The reservoir is operably coupled to a municipal supply line and utilizes float valve 113 to ensure the maintenance of a desired water level within the reservoir 110. A metering pump 115 is fluidly coupled to the reservoir 110 and is further operably coupled to a nutrient container 120. The metering pump 115 is further operably coupled to each plant bucket 10. The metering pump 115 is a conventional electric metering pump and is configured to introduce aliquots of a liquid nutrient disposed within the nutrient container 120. The metering pump 115 is configured to introduce aliquots of liquid nutrient either into the reservoir 110, each plant bucket 10 or both. The nutrient container 120 is a receptacle configured to receive and store various liquid nutrients. As will be further discussed herein, a preferred nutrient is a calcium magnesium liquid solution.

Fluidly coupled to the reservoir 110 is controller 125. Controller 125 functions to receive water from the reservoir 110, store and subsequently distribute to the remainder of the plant growing system 100. The controller 125 includes the necessary electronics and pumps to execute the desired functionality as expressed herein. The controller 125 is located at a level that is higher than that of the reservoir 110. It is desired within the preferred embodiment of the present invention that the controller 125 distributes water to the plant buckets 10 through use of gravitational force. In order to accomplish this objective the controller 125 is configured to retain a volume of water and this water is distributed downstream via gravitational force due to the elevated location of the controller 125. While it is the preferred embodiment of the plant growing system 100 to position the controller 125 in an elevated position, it is further contemplated that the controller 125 could have pumps operably coupled thereto so as to effect the distribution of water to the plant buckets 10. The controller 125 further includes an air vent line 198. The controller 125 maintains a water level therein so as to ensure the ability to distribute water to the plant buckets 10 fluidly of the plant growing system 100 through gravitational force. The maintained water level within the controller 125 is adjustable so as to accommodate alternate lengths of pipe 101. Controller 125 is further configured to be drained as desired intermediate water fills to the plant buckets 10 so as to allow the controller to dry and inhibit growth of mildew and the like. The plant growing system 100 further includes a water temperature controller 130. It is contemplated within the scope of the present invention that the controller 125 can be configured to execute water fills to the plant buckets 10 either on demand from as initiated by float 30 or provide at desired time intervals. The water temperature controller 130 is fluidly coupled to the reservoir 110 and is operable to adjust the temperature of the water therein. It is desired within the scope of the present invention that the temperature of the water being distributed to the plant buckets 10 is approximately seventy to seventy-two degrees. The water temperature controller 130 includes the necessary electronics to either increase or decrease the temperature of the water passing therethrough.

Fluidly coupled to the reservoir 110 is an ozonator 135. The ozonator 135 is a conventional water ozonator that is operable to introduce ozone into the water passing through the ozonator 135. Adding ozone to the water sanitizes and oxides the water prior to the water being introduced into the plant buckets 10. The ozonator 135 is coupled to the water temperature controller 130 utilizing pipe 101. Pipe 101 is a main fluid line that is operable to fluidly couple all of the aforementioned elements of the plant growing system 100. Pipe 101 is a conventional PVC pipe and it is contemplated that the pipe 101 could be provided in various different diameters. Pipe 101 has main air-line 102 at the distal end 103 thereof. The main air-line 102 extends vertically upward and is of sufficient height so as to inhibit the egression of water therefrom and further functions to provide an air vent for the pipe 101 so as to remove air therefrom. Pipe 101 is further configured to have an air-line 102 every ten feet along the entire length thereof. An air-line every ten feet provides additional entry for air into the pipe 101 intermediate water filling cycles. The plant growing system 100 is configured to provide water to the plant buckets as needed but intermediate transfer of water, the air-lines 102 and air vent pipes 108 facilitate the introduction of air and promote the drying of the pipe 101 and pipe 109 so as to inhibit the growth of bacteria and mildew therein.

As is shown in the diagram in FIG. 5, the plant growing system 100 includes a plurality of plant buckets 10 fluidly coupled to pipe 101 utilizing pipes 109. Each pipe 109 includes an air vent pipe 108 that functions to eliminate air from pipes 109. The air vent pipes 108 are placed at the beginning and end points of each pipe 109. This allows the pipes 109 to have air introduced thereinto for drying intermediate water fills from the pipes 109. The pipes 109 are operably coupled to float 30 wherein the float 30 is operable to move in an upwards-downwards direction on the surface of the water disposed within the plant bucket 10 and as such control and maintain the amount of water within the interior volume 15 of the plant bucket 10. As will be further discussed herein, the level of water maintained within the plant bucket 10 is always maintained at a level wherein the roots of a plant have at least one inch of air exposure and are not completely submerged in the water disposed in the plant bucket 10. Furthermore, it is desired within the scope of the present invention that the water in the plant growing system 100 is maintained at a pH level within the range of 5.5 to 6.5. It is contemplated within the scope of the present invention that the pH of the water in the plant growing system 100 could be maintained through either electronic or chemical techniques.

Figure 6:
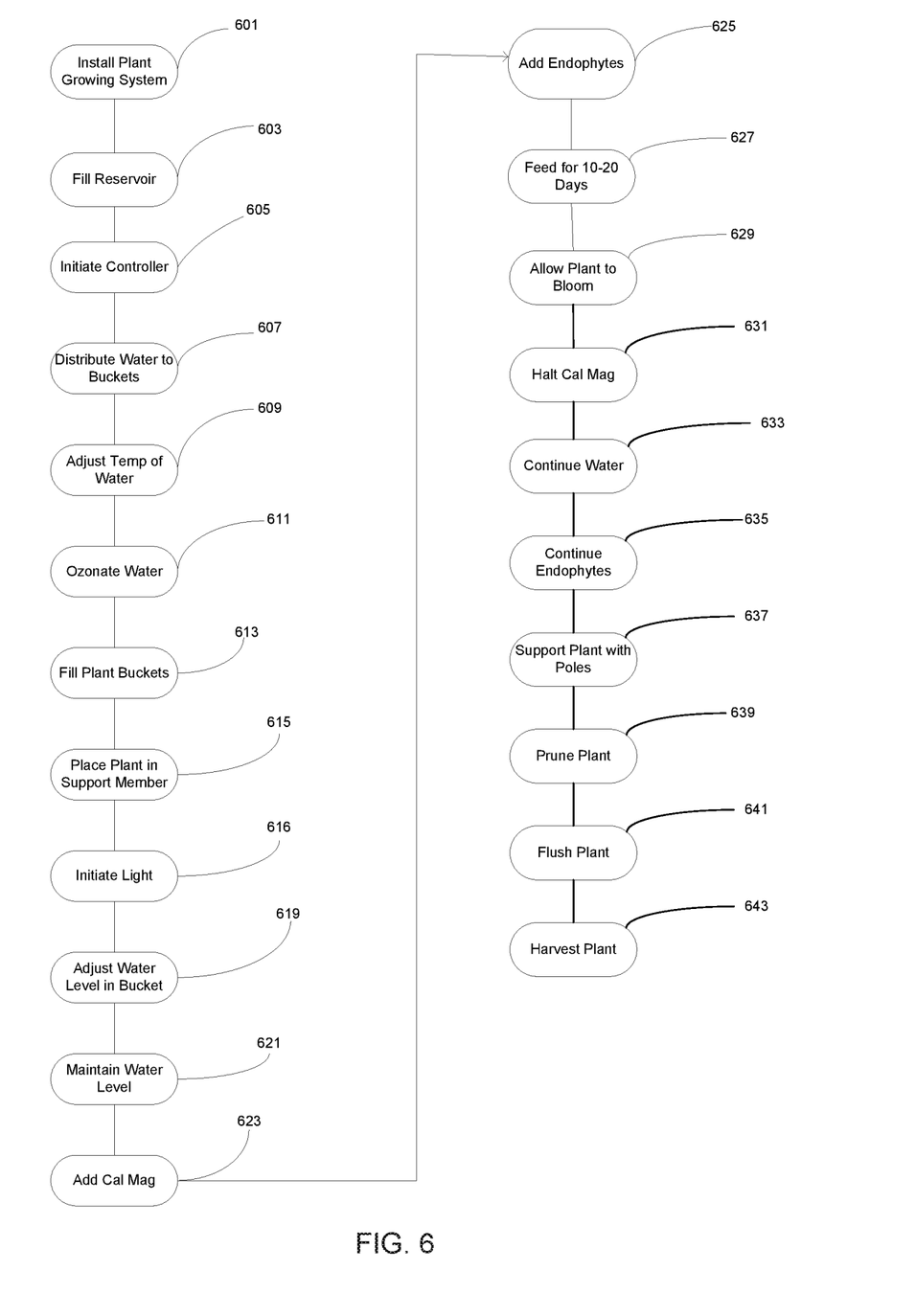
FIG. 6 is the method of the plant growing system of the present invention.

Now referring to FIG. 6 herein, a method of operation of the plant growing system 100 is as follows. In step 601, the plant growing system is installed in a desired location. It should be understood by those skilled in the art that the plant growing system 100 is installed in an indoor environment. Further installation is to include operable coupling of the elements discussed herein in FIG. 5. Step 603, the reservoir 110 is initially filled with water to a desired level. In step 605, the controller 125 is electrically coupled to a suitable power source and initiated. Step 607, water is drawn from the reservoir 110 and transferred to the controller 125 wherein a portion of the water drawn from the reservoir 110 is further distributed to each of the plant buckets 10 operably coupled to the plant growing system 100. In step 609, as the water is transferred from the controller 125 to the plant buckets 10, the water temperature controller 130 alters the temperature of the water so as the water exits therefrom the water is at a temperature between the range of seventy to seventy-two degrees Fahrenheit. In step 611, as the water exits the water temperature controller 130, the water is ozonated by the ozonator 135. Step 613, the plant buckets 10 are filled to a desired level with water. In step 615, plants are placed in the plant support members 40. In step 616, the plant growing system 100 in particular the plant buckets 10 and plant support members 40 are exposed to continuous light. It is preferred within the scope of the present invention that a light source such as but not limited to a metal halide light is utilized so as to produce a sufficient amount of light. In step 619, ensuing deposit of a plant into the plant support member 40, the water within each plant bucket is adjusted to the desire level. It is preferred within the scope of the present invention that the water level in each plant bucket 10 is set so as to provide one inch of air exposure to the roots of a plant disposed in the plant support member 40. In step 621, the controller 125 in conjunction with each float 30 disposed within the plant buckets 10 maintain the desired water level in each plant bucket 10. In step 623, the metering pump 115 extracts an aliquot of nutrients disposed within the nutrient container 120 and deposits into the reservoir 110. It is desired within the scope of the present invention that the nutrient container 120 has disposed therein a calcium-magnesium solution. It is further desired within the scope of the present invention that fifteen milliliters of the calcium magnesium solution is extracted from the nutrient container 120 and deposited into the reservoir 110 every three days. In step 625, endophytes(bacteria) are added to the reservoir 110 every seven days. Step 627, the aforementioned feeding process is continued for ten to twenty days. In step 629, the plant disposed within the plant buckets 10 grow to bloom stage. In step 631, ensuing the plant reaching a bloom stage, the calcium-magnesium solution introduction into the reservoir is halted. In step 633, the plant growing system 100 continues to maintain the water levels required in each plant bucket 10. Step 635, endophyte introduction continues on an interval of every seven days. In step 639, a user of the plant growing system will prune the plant as required. In step 641, each plant bucket 10 has only water introduced thereinto for a period of four to five days ensuing each plant completing its bloom stage and having entered a ripening stage. Step 643, plants disposed within the plant buckets 10 are harvested.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A plant growing method operable to facilitate the growing of plants in an indoor environment comprising the steps of:

installing a plant growing apparatus, wherein the plant growing apparatus includes a reservoir, said reservoir being configured to receive and store water, said plant growing apparatus further including a controller, said controller being fluidly coupled to said reservoir, said controller being positioned at a level that is above said reservoir, said controller configured to receive water from said reservoir and distribute to the plant growing apparatus; said plant growing apparatus further including a plant bucket, said plant bucket fluidly coupled to said controller utilizing a pipe network, said plant bucket configured to receive a plant therein, said plant bucket having at least one wall and a bottom integrally formed to create an interior volume and further having an opening, said plant bucket further having a top member, said top member of said plant bucket configured to be superposed the opening of said plant bucket, said top member having an aperture, said plant growing apparatus further including a plant support member, said plant support member being square in shape, said plant support member having a first layer and a second layer, said first layer being superposed said second layer, said first layer and said second layer of said plant support member each being comprised of four support members, said plant support member being superposed said plant bucket, wherein the plant support member further includes a support disk, said support disk being mounted adjacent said second layer of said plant support member, said plant support member further including a plant net member, said plant net member extending downward into the interior volume of said plant bucket, said plant bucket further including a deflector panel, said deflector panel being mounted to the top member and extending downward into the interior volume of the plant bucket, said deflector panel being arcuate in shape so as to reduce interference with a plant root system of a plant disposed in the interior volume of the plant bucket, said deflector panel providing protection for a float member operably coupled to a fill valve and wherein the plant growing apparatus further includes a plurality of air vent pipes, said air vent pipes providing removal of air from a pipe network of the plant growing apparatus;

filling said reservoir, said reservoir being filled with water;

initiating the controller;

distributing water to the plant bucket;

ozonating the water, said ozonating the water being accomplished by an ozonator, said ozonator being fluidly coupled with the pipe network;

controlling a temperature of the water being distributed to the plant bucket, said controlling the temperature of the water being accomplish by a water temperature controller;

filling the plant bucket with water to a desired water level;

placing a plant in the plant bucket;

initiating exposure of the plant to a light;

adjusting the water level within the plant bucket, said adjusting the water level being executed by said float member and said fill valve;

maintaining the water level within the plant bucket, wherein the float member floats on a surface of the water level and initiates the fill valve so as to maintain the water level;

adding a calcium-magnesium solution to the reservoir, said calcium-magnesium solution being stored in a nutrient container, said nutrient container being operably coupled with a metering pump;

feeding the plant for a period of ten to twenty days, wherein the plant is fed with said calcium-magnesium solution;

adding endophytes to the water;

allowing the plant to bloom;

halting the addition of the calcium-magnesium solution to the reservoir, said halting the addition of the calcium-magnesium solution to the reservoir occurring subsequent blooming of the plant disposed within the plant bucket;

flushing the plant bucket with water;

allowing the plant to ripen; and harvesting the plant.

2. The plant growing method as recited in claim 1, wherein the step of adding a calcium-magnesium solution to the reservoir is executed by adding fifteen milliliters of calcium-magnesium solution to the reservoir every three days.

3. The plant growing method as recited in claim 2, wherein the support disk further includes a lip member, said lip member being configured to engage the support member encircling the aperture of said top member of said plant bucket.

4. The plant growing method as recited in claim 3, wherein the step of adjusting the water level within the plant bucket is executed such that one inch of root of the plant disposed in the interior volume of the plant bucket is exposed to air within the interior volume of the plant bucket.

5. The plant growing method as recited in claim 4, wherein the step of flushing the plant bucket with water is executed for a period of four to five days.

6. The plant growing method as recited in claim 5, and further including the step of maintaining a pH of the water, wherein the pH of the water is maintained at a level between 5.5 to 6.5 pH.

\* \* \* \* \*